United States Patent [19]

Platte et al.

[11] Patent Number: 4,769,726
[45] Date of Patent: Sep. 6, 1988

[54] MAGNETIC TAPE RECORDER

[75] Inventors: Hans-Joachim Platte, Hemmingen; Hartmut Schandl, Villingen; Robert Einsel, Celle, all of Fed. Rep. of Germany

[73] Assignee: Telefunken Fernseh und Rundfunk GmbH, Hanover, Fed. Rep. of Germany

[21] Appl. No.: 803,807

[22] Filed: Dec. 2, 1985

[30] Foreign Application Priority Data

Dec. 1, 1984 [DE] Fed. Rep. of Germany ....... 3443879

[51] Int. Cl.$^4$ ...................... G11B 5/584; G11B 15/20; G11B 23/087
[52] U.S. Cl. .................................... 360/84; 360/10.2; 360/10.3; 360/132
[58] Field of Search ...................... 360/70, 77, 84, 85, 360/132, 10.1–10.3

[56] References Cited

U.S. PATENT DOCUMENTS

| 2,963,555 | 12/1960 | Brubaker | 179/100.2 |
| 2,979,558 | 4/1961 | Leyton | 360/70 |
| 3,005,056 | 10/1961 | Goldmark et al. | 360/70 |
| 3,050,594 | 8/1962 | Bick et al. | 179/100.2 |
| 3,141,065 | 7/1964 | Luther et al. | 360/70 |
| 3,213,204 | 10/1965 | Okamura | 360/84 |
| 3,692,255 | 9/1972 | Von Behren | 242/192 |
| 4,167,023 | 9/1979 | Bessette et al. | 360/10.2 |

FOREIGN PATENT DOCUMENTS 2600737 7/1976 Fed. Rep. of Germany .

Primary Examiner—Robert S. Tupper
Attorney, Agent, or Firm—Spencer & Frank

[57] ABSTRACT

A magnetic tape apparatus for recording of data, including two spaced apart tape guides for guiding a movable magnetic tape therebetween, the portion of the tape between the tape guides being in tension, magnetic heads between the guides for scanning the tape, and a main tape drive which selectively moves the tape continuously in a path which includes a segment extending between the guides past the magnetic heads, the tape guides and magnetic heads being shiftable relative to each other independently of the main tape drive for longitudinally shifting the portion of the tape between the tape guides relative to the magnetic heads.

9 Claims, 5 Drawing Sheets

MAGNETIC TAPE RECORDER

BACKGROUND OF THE INVENTION

The invention relates to a magnetic tape apparatus of the type in which data is recorded by means of magnetic heads which scan a movable magnetic tape which is tensioned between two tape guides, particularly for magnetically recording and playing back with rotating head wheels.

A magnetic tape unit for recording data is known in which the magnetic tape is moved back and forth between two separately mounted reels, with both reels being driven via mandrels. Such magnetic tape units are used for longitudinal recordings, slant track recordings or for transverse track recordings. In such devices, the reels are usually disposed in cassettes. For longitudinal recordings, the magnetic tape remains within the cassette and the magnetic head for recording or scanning is pressed from outside against a tape disposed in the cassette and tensioned between two tape guides. For the slant track recording, the magnetic tape is pulled out of the cassette before the recording or playback and is placed around a head drum. For transverse track recording, the magnetic tape can also remain in the cassette. But in this case, the tape which is movable back and forth within the cassette, at the location where it is to be scanned, is curved transversely to its direction of movement around a head drum wheel whose axis of rotation is parallel to the direction of tape movement and whose tracks are thus recorded on the tape essentially or almost perpendicularly to the direction of tape movement. For magnetic tape units employing transverse track recordings, it has also been proposed, for still picture playback or track monitoring, to displace the head wheel, which serves to perform recording and/or playback, in the axial direction.

BRIEF SUMMARY OF THE INVENTION

It is the object of the invention to provide a magnetic tape unit in which track monitoring and/or a still picture can be produced without or with reduced head displacement. This problem is solved in a magnetic tape unit of the type in which data is recorded by means of magnetic heads which scan a movable magnetic tape which is tensioned between two tape guides, particularly for magnetically recording and playing back with rotating head wheels by providing that whether the magnetic tape is moving or not moving, the portion of the magnetic tape which is tensioned between the tape guides is movable relative to a reference point in the direction of tape movement.

In principle, the problem is solved in that the magnetic tape tensioned between the tape guides, whether moving or not moving, can be moved relative to a reference point without utilization of the primary tape drive.

BRIEF DESCRIPTION OF THE DRAWINGS

To explain the invention in greater detail, several embodiments will be described below with reference to the drawings. The latter show in FIG. 1, a basic illustration of the invention.

DETAILED DESCRIPTION OF THE PREFERRED EMBODIMENTS

Figure 1:
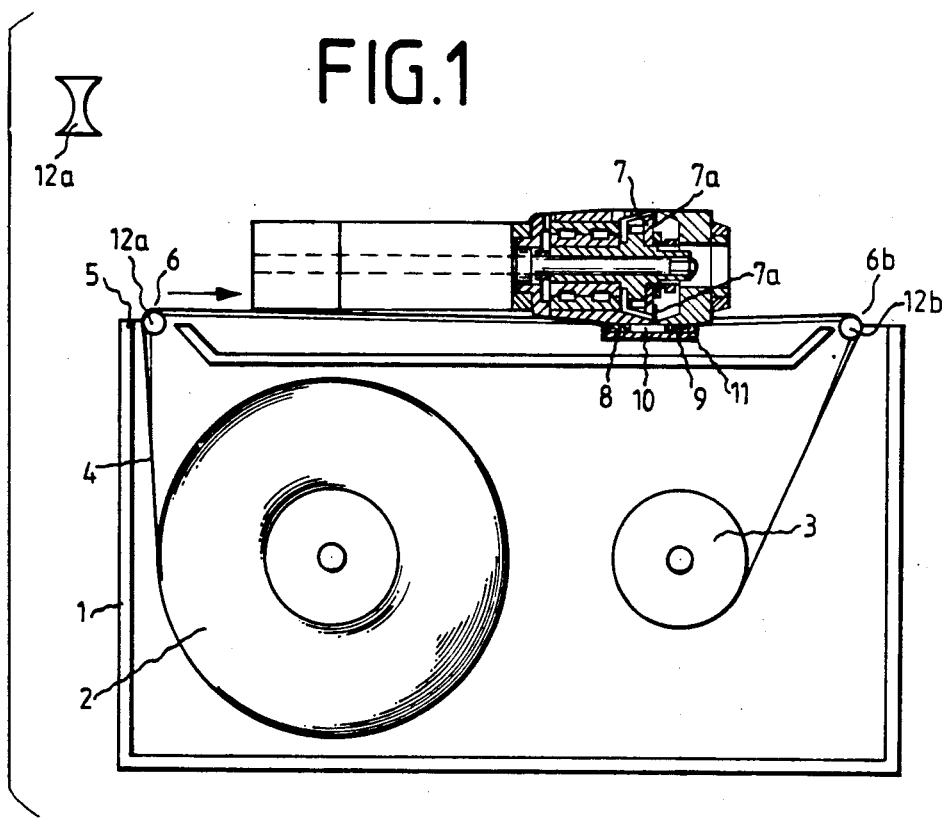

FIG. 1 shows a magnetic tape unit composed of two reels or tape coils 2 and 3 disposed in a cassette 1, with a magnetic tape 4 being movable back and forth between the reels. The magnetic tape 4 is brought out of cassette 1 at its longitudinal frontal face 5, for example by means of a projection 6 and, for transverse track recording, is adapted to the shape of a head wheel 7 in the region of the scanning location. This is done, for example, by means of two felt pieces 8 and 9 which are disposed at both sides of the scanning location and leave between them a groove-like depression 10. Felt pieces 8 and 9 are fastened to a flexible support 11 which is stationarily mounted in cassette 1 and permits flexible adaptation of felt pieces 8, 9 to the outer diameter of head wheel 7. Tape 4 is placed over felt pieces 8, 9 to closely follow the contours of head wheel 7 and is tensioned in such a manner that optimum scanning characteristics result for tape 4 in the region of the heads 7a of head wheel 7 (tape-to-head contact). Head wheel 7 is configured as a head drum or tape guide cylinder or is inserted into a head drum. The curvature of tape 4 is dimensioned such that the angle of looping of the tape region lies between 40° and 70°, depending on the diameter of the head wheel or the head drum. In the region of the projection or location of the exit 6 from cassette 1, before entering the scanning location and in the region of the location of entrance 6b into the cassette, behind the scanning location, tape guides 12a and 12b, respectively, are provided. The outlines of these guides 12a and 12b, seen in a longitudinal sectional view, are essentially biconcave. This causes tape 4 to be precurved before it enters the location of the entrance into the scanning region.

Figure 2:
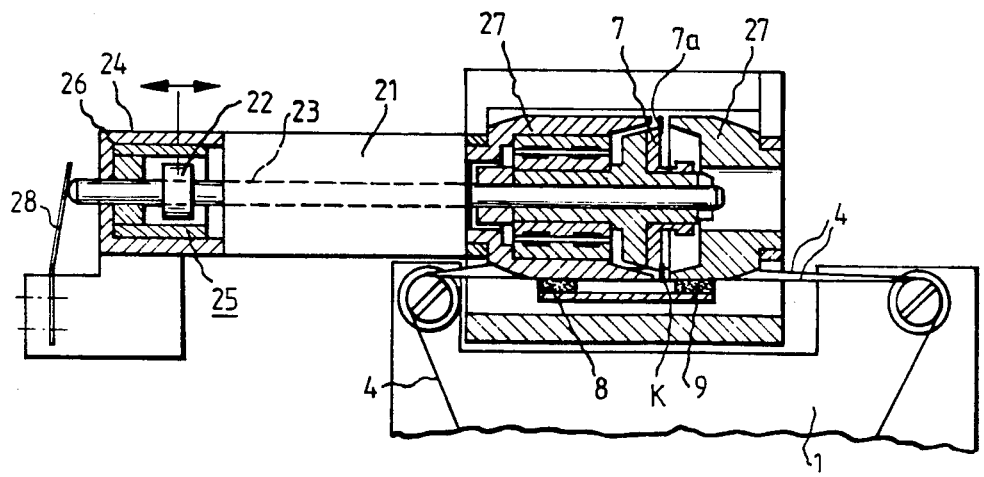
FIG. 2, a detail view of a head wheel system that is displaceable in its axial direction.

FIG. 2 shows, in a partial sectional view, the drive system for head wheel 7 in the operating position together with an inserted magnetic tape cassette 1 in which a magnetic tape 4 is driven. Magnetic tape 4 lies between head wheel 7 or a tape guide cylinder 27 accommodating head wheel 7, and the felt cushions 8, 9. In this embodiment, tape guide cylinder 27 is permanently attached but does not rotate. In the effective region of magnetic heads 7a disposed on head wheel 7, magnetic tape 4 is then curved in such a manner that its surface is adapted to the circle described by magnetic heads 7a. This precise adaptation permits good tape-to-head contact. Head wheel 7 is provided with 2n heads 7a whose gaps alternatingly have different azimuth angles.

The input and output of the signal voltages to and from magnetic heads 7a is effected by means of two three-phase transformers 24. If the device has four or more heads, the magnetic heads 7a having the same azimuth angle are each electrically connected with one three-phase transformer 24. This can be done by connecting the magnetic head coils in series or in parallel.

Head wheel 7 is driven by a drive motor 21 which is disposed, together with head wheel 7 and an electromechanical transducer 25 provided for follow-up control, on a common axle 23. Electromechanical transducer 25 is composed of a coil 26 into which a soft-iron core 22 and the axle supporting it are pulled against a spring 28 when a control voltage is applied.

Transducer 25 is preferably part of drive motor 21 so that upon application of the control voltage, the rotor of motor 21 is displaced in the axial direction.

In a proven embodiment, a flexible support 11 in the form of a copper beryllium foil, was used for felt members 8, 9. This foil has antimagnetic characteristics and sufficient elasticity as well as durability. Support 11 itself may be planar, with felt pieces 8 and 9 being shaped. Or, support 11 may itself be adapted to the head wheel diameter and may be equipped with felt pieces, 8 and 9 of uniform, flat configuration.

Figure 3:
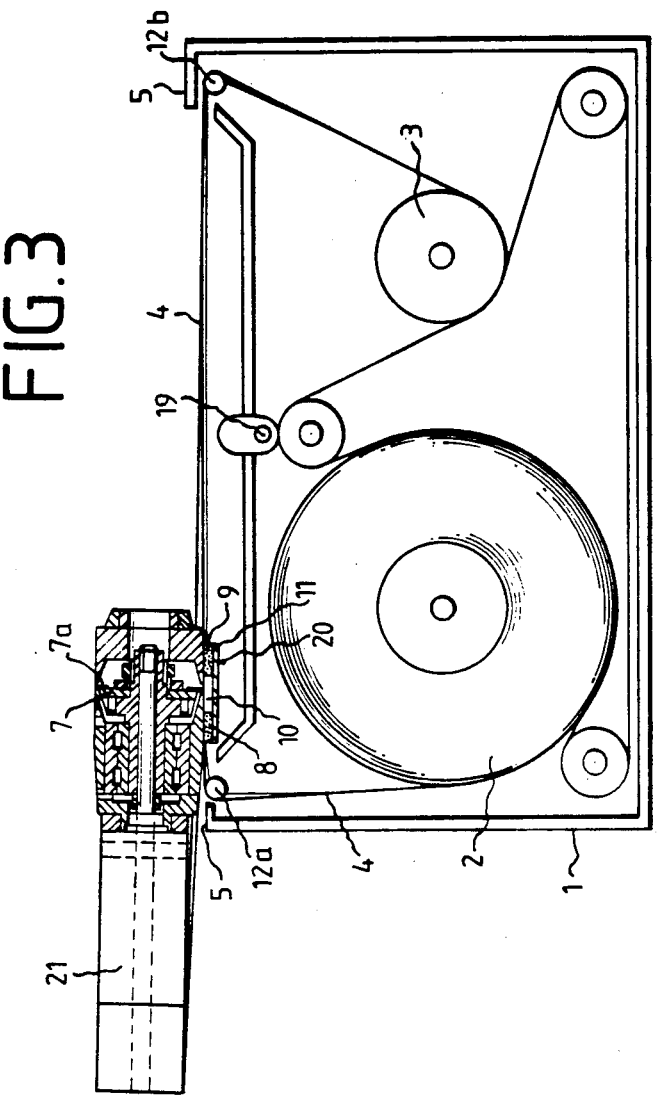
FIG. 3, an embodiment of a cassette according to the invention.

FIG. 3 shows a modified cassette 1 in which tape reels 2 and 3 are no longer driven directly but are rotatably mounted in cassette 1 without having their own direct drive. The actual driving is performed by a separate roller 19 which is introduced into cassette 1 from the outside and drives tape 4 itself in the region between tape reels 2, 3. A cassette having such a drive is disclosed, for example, in German Pat. Nos. P 1,187,028 and 2,230,281.

The cassette is of such design that the tape guides or rollers 12a, 12b, which have a biconcave shape so as to curve the tape, are disposed near those edges of cassette 1 which delimit the longitudinal frontal face 5 facing head wheel 7. In the unit, head wheel 7 is disposed in such a manner that the scanning location lies near roller 12a and the motor 21 for driving head wheel 7 is disposed outside the region of cassette 1. This keeps possible stray magnetic fields from motor 21 away from cassette 1 and tape 4. Other possibly still interfering magnetic fields can be kept away from the tape by shieldings in the device and/or in the cassette.

Figure 4:
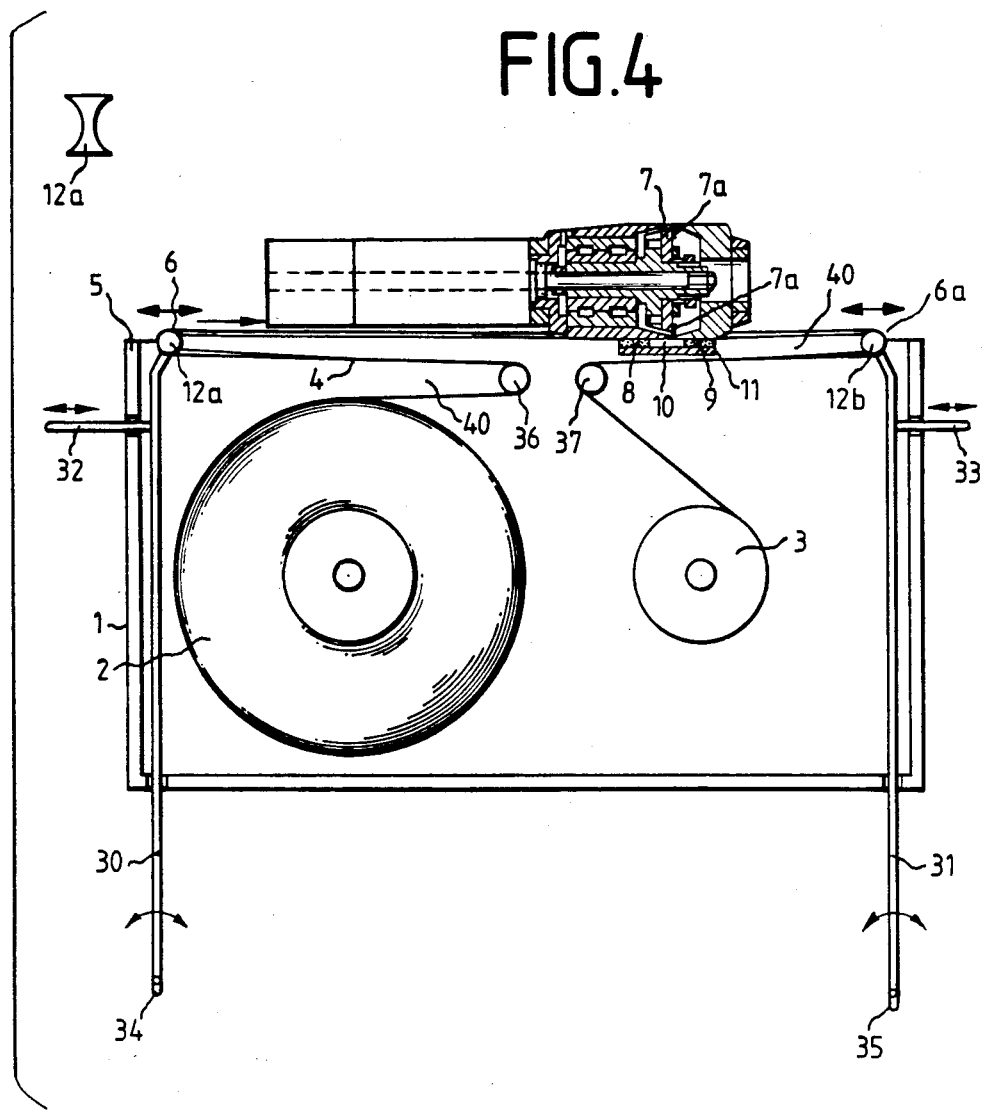
FIG. 4, another embodiment of a cassette according to the invention.

FIG. 4 shows a modification according to the invention of the cassette 1 shown in FIG. 1 which permits a function similar to transducer 25. Tape guides 12a, 12b do not directly guide tape 4 to tape reels 2, 3 but around one or two further tape guides 36, 37 so as to form one or two tape loops 40. In the scanning region, tape guides 12a, 12b are displaceable essentially parallel to the direction of tape movement. For this purpose, two levers 30,31 are provided which are jointly pivotal around respective axles 34,35 by means of slides 32, 33. Displacement is effected in dependence on control signals for setting the track and/or for producing tracks corresponding to an accurate image or partial image. In this way, the position of the track relative to heads 7a can be corrected and/or still pictures can be recorded.

Figure 5:
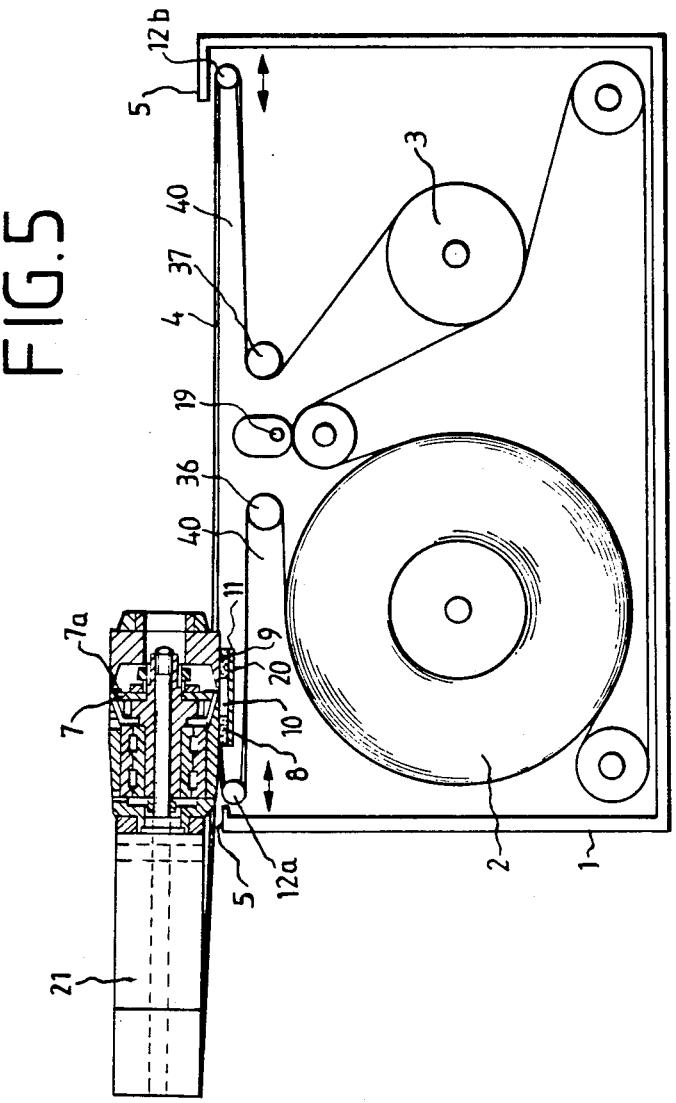
FIG. 5, a detail view of FIG. 3.

FIG. 5 shows a modification of the arrangement of FIG. 3 as shown in FIG. 4. As in FIG. 4, displacement of tape guides 12a, 12b may be effected by means of pivot layers or by electrically coupled or mechanically coupled means.

Figure 6:
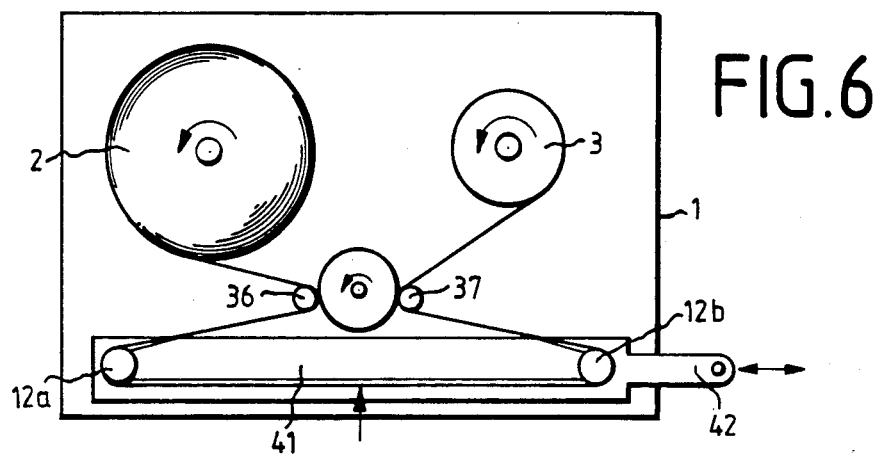
FIG. 6, an embodiment having reels disposed in the cassette but not driven themselves.

FIG. 6 shows an embodiment including a shaped body 41 which permits simultaneous displacement of both tape guides 12a, 12b. For this purpose, both tape guides 12a, 12b of FIG. 6 are rotatably fastened on shaped body 41. Shaped body 41 is displaceably mounted in cassette 1. A projection 42 is externally accessible and can be moved by an electromechanical transducer (not shown) which can be set by means of control signals to have the accuracy required for track position correction or track displacement.

Figure 7:
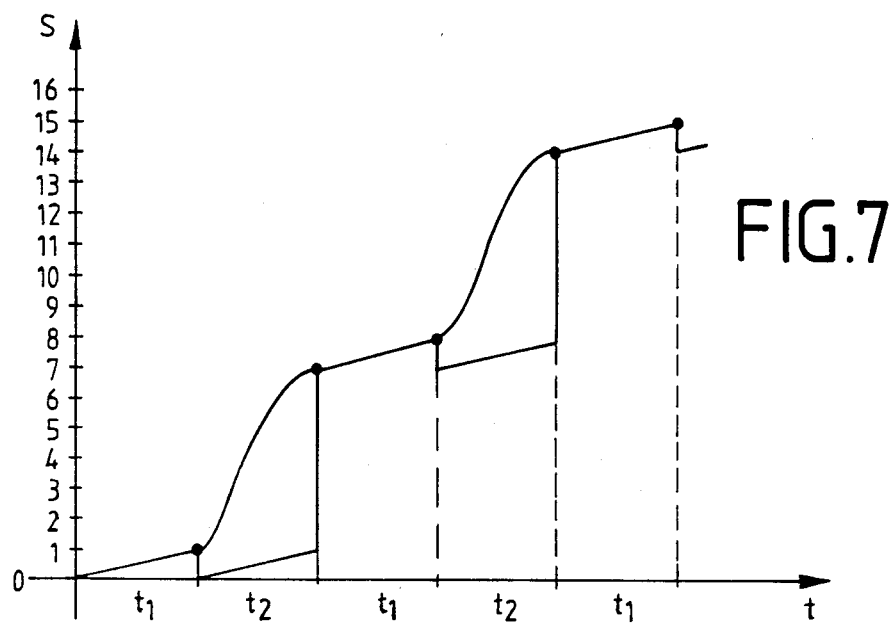
FIG. 7 a path/time diagram and motion curve realizable with the present invention.

FIG. 7 shows a path/time diagram and motion curve that can be realized with the present invention for the fast forward mode. The ordinate s shows the paths, the abscissa t the time. It is assumed that during time t1 the tape is moved at a continuous, steady speed past scanning location 10 as is customary for playing back and recording the tracks. At the same time, the signal for image 1 is read into a memory and displayed on a screen. During time t2, it is assumed that a motion component is additionally superposed on tape 4 due to displacement of tape 4 in the direction of tape movement by displacement of shaped body 41. During t2, this initially results in accelerated, then fast and finally slowed-down movement which guides head 7a to the start of, for example, the seventh frame. During the advance, the first frame is repeated from memory. During the next section t1 (all sections t1 include storage and playback; all sections t2 include fast forward and playback of the memory contents), frame 7 is read out and played back simultaneously. Fast reverse is possible in a similar manner.

Figure 8:
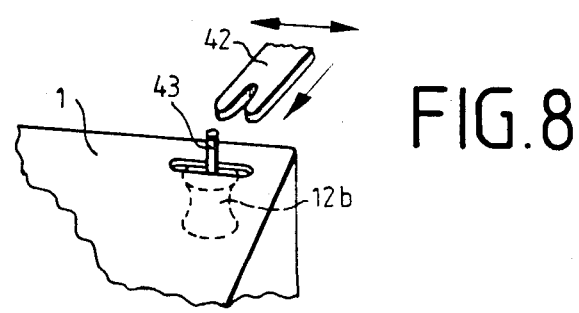
FIG. 8, a displacement mechanism.

FIG. 8 shows a modification in which the axles 43 of tape guide rollers 12a, 12b project from the cassette and engage in actuation means, such as controlled projection 42.

Projection 42 may be controlled by electromechanical transducers. However, it is also possible to provide a profile control for certain applications.

| Legends on Drawing FIGS. | |
|---|---|
| FIG. 1, | Kopfeinheit = head unit |
|  | Andruckfilz = felt cushion |
| FIG. 2, | Abschirmung = shielding |
| FIG. 3, | Abschirmung = shielding |
|  | Antriebsband = driven tape |
| FIG. 4, | Kopfeinheit = head unit |
|  | Andruckfilz = felt cushion |
| FIG. 5, | Abschirmung = shielding |
|  | Antriebsband = driven tape |

What is claimed is:

1. A magnetic tape apparatus, comprising:
first and second spaced apart tape guides for guiding a movable magnetic tape therebetween;
means for tensioning the portion of the tape between said first and second tape guides;
means, including magnetic heads between said first and second guides for scanning the tape between said first and second tape guides;
moving means for selectively continuously moving the tape in a longitudinal direction along a path, the path including a segment extending between said first and second guides past said magnetic heads; and
shifting means, operable while said first moving means is moving the tape along said path and while said moving means is not moving said tape along said path, for shifting said first and second tape guides relative to said magnetic heads so as to longitudinally shift the portion of the tape along said segment with said shifting of said first and second tape guides.

2. A magnetic tape apparatus as in claim 1, further comprising a supply reel for supplying the tape to said segment and a take-up reel for taking up the tape after passing from said segment, means for passing the tape through a tape loop between said supply reel and said take-up reel and trained over said first and second tape guides, and means for controlling the momentary position of said first and second tape guides to shift longitudinally relative to said heads the portion of the tape along said segment at least temporarily and independently of position and speed of the tape.

3. A magnetic tape apparatus as in claim 2, including a control system means for providing coordinated control of said shifting means and said moving means.

4. A magnetic tape apparatus as in claim 1, including a playback device, said first and second tape guides being disposed in said playback device.

5. A magnetic tape apparatus as in claim 1, further comprising means for passing the tape through a tape loop trained through said first and second tape guides, said first and second tape guides comprising means for deflecting the tape so as to tension the tape loop such that immediately before and after said shifting of said first and second tape guides, the respective directions of movement of the tape through said first and second guides are essentially parallel to each other.

6. A magnetic tape apparatus as in claim 5, further comprising means for connecting said first and second tape guides together such that the distance between said first and second tape guides is held constant during said shifting of said first and second tape guides.

7. A magnetic tape apparatus as in claim 1, further comprising a track guide system, said track guide system including means for controlling said shifting means.

8. A magnetic tape apparatus, comprising:
first and second spaced apart tape guides for guiding a movable magnetic tape therebetween;
an exchangeable cassette for accommodating the magnetic tape, said first and second tape guides being disposed in said cassette;
means for tensioning the portion of the tape between said first and second tape guides;
means, including magnetic heads between said first and second guides for scanning the tape between said first and second tape guides;
moving means for selectively continuously moving the tape in a longitudinal direction along a path, the path including a segment extending between said first and second guides past said magnetic heads; and
shifting means, operable while said first moving means is moving the tape along said path and while said moving means is not moving said tape along said path, for shifting said first and second tape guides relative to said magnetic heads so as to longitudinally shift the portion of the tape along said segment with said shifting of said first and second tape guides.

9. A magnetic tape apparatus, comprising:
first and second spaced apart tape guides for guiding a movable magnetic tape therebetween;
means for tensioning the portion of the tape between said first and second tape guides;
means, including magnetic heads between said first and second guides for scanning the tape between said first and second tape guides;
moving means for selectively continuously moving the tape in a longitudinal direction along a path, the path including a segment extending between said first and second guides past said magnetic heads;
shifting means, operable while said first moving means is moving the tape along said path and while said moving means is not moving said tape along said path, for shifting said first and second tape guides relative to said magnetic heads so as to longitudinally shift the portion of the tape along said segment with said shifting of said first and second tape guides; and
means for passing the tape through a tape loop trained through said first and second tape guides, said first and second tape guides comprising means for deflecting the tape so as to tension the tape loop such that immediately before and after said shifting of said first and second tape guides, the respective directions of movement of the tape through said first and second guides are essentially parallel to each other;
said connecting means comprising a shaped body, said first and second tape guides being mounted to said shaped body, said shifting means comprising means for controlling the position and speed of movement of said shaped body.

* * * * *